W. WROBEL.
COOKING UTENSIL.
APPLICATION FILED JAN. 27, 1914.
1,130,234.
Patented Mar. 2, 1915.
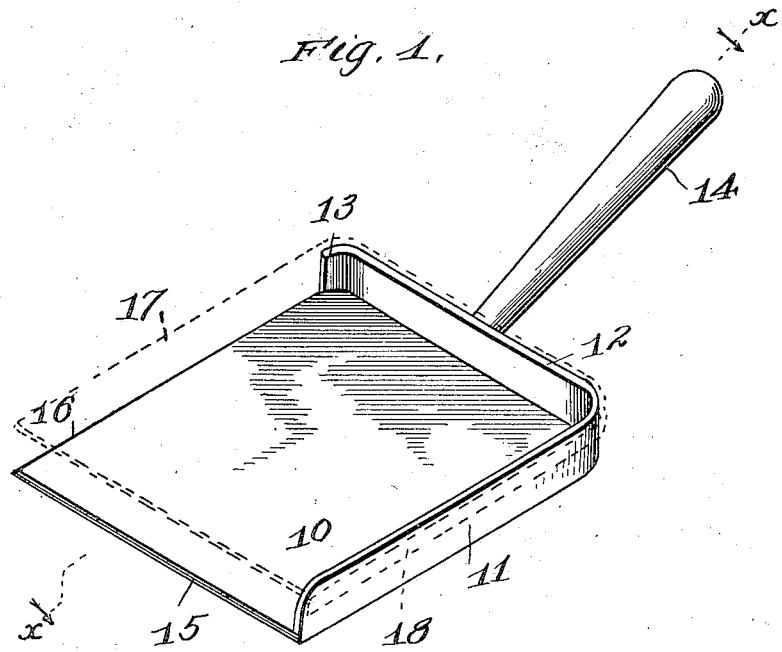
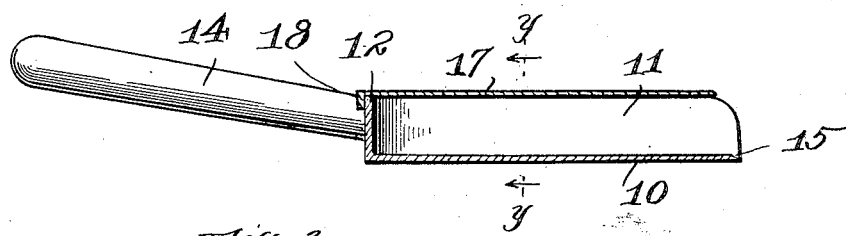
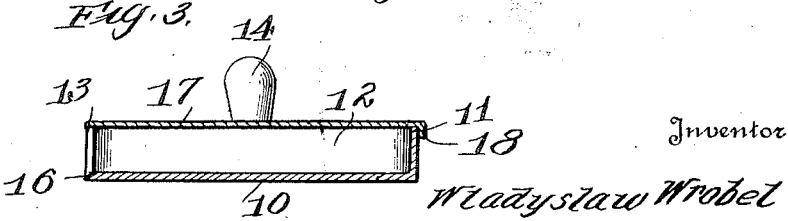
Witnesses
G. W. Paubuschmitt
Milton E. Lowry
Inventor
Wladyslaw Wrobel
By A. M. Wilson
Attorney

UNITED STATES PATENT OFFICE.

WLADYSLAW WROBEL, OF LITTLE FALLS, NEW YORK.

COOKING UTENSIL.

1,130,234.  Specification of Letters Patent.  Patented Mar. 2, 1915.

Application filed January 27, 1914. Serial No. 814,648.

*To all whom it may concern:*

Be it known that I, WLADYSLAW WROBEL, a subject of the Emperor of Austria-Hungary, residing at Little Falls, in the county of Herkimer and State of New York, have invented certain new and useful Improvements in Cooking Utensils, of which the following is a specification.

This invention relates to certain new and useful improvements in cooking utensils.

An object of the invention is to provide a cooking utensil that may be utilized for many different purposes, such as a cake turner, baking pan, or griddle, etc.

With the above and other objects in view which will appear as the nature of the invention is better understood, the same consists of the novel construction, combination and arrangement of parts to be hereinafter more fully described and then claimed, reference being had to the accompanying drawing by like characters throughout the several views, and wherein:—

Figure 1 is a perspective view of a cooking utensil built in accordance with my invention, the cover being shown in dotted lines. Fig. 2 is a sectional view taken on the line $x$—$x$ of Fig. 1 with the cover thereon, and, Fig. 3 is a sectional view taken on the line $y$—$y$ of Fig. 2.

Referring more specifically to the drawing accompanying this application, the reference numeral 10 designates the bottom of the pan provided upon two of its sides with walls 11 and 12. The wall 11 is formed at the edge of one of the longitudinal sides and the wall 12 is formed at the rear end of the bottom 10 of the pan, the walls 11 and 12 being formed integral with the bottom 10. The end 13 of the rear wall 12 extends a short distance on that side of the bottom 10 opposite the wall 11. A handle 14 of suitable length and angularity is connected to the rear wall 12 for purposes of handling the utensil. The free front and side edges of the bottom 10 are provided with beveled surfaces or knife edges 15 and 16 respectively, for purposes hereinafter described.

I sometimes construct the device with a cover 17 provided with a downwardly-extending flange 18 along the edges which lie upon the walls 11 and 12. This cover is sometimes secured fixedly to the walls 11 and 12 as the cakes when in dough form can be placed on the bottom 10 through the open side or open front end.

The device is readily adaptable for many cooking purposes, and when utilized as a cake turner, either of the knife edges 15 or 16 may be slipped under a griddle cake and the walls 11 and 12 will prevent the cake from falling off of the bottom 10 during the turning movement of the device.

A particular function of the utensil is to utilize the same for the baking of bread and biscuits or other small cakes, the baked articles being permitted to slide off of the bottom 10 by way of the free edges 15 and 16. The handle 14 may be lengthened similar to a baker's peel and the device used as a peel to remove several pans of bread from an oven.

While I have shown and described the preferred embodiment of my invention, I do not wish to confine myself thereto, as forms, modifications, and arrangements of the parts as shown may be had without departing from the spirit and scope of the invention as claimed.

What is claimed as new is:—

A cooking vessel comprising a plate having a flat upper surface, and provided with a flange extending across the width of the rear edge of the plate, partly along one side edge, and throughout the length of the other side edge of the plate to provide cover supports at the rear corners of the plate, a handle projecting rearwardly from the plate flange, and a cover corresponding in dimensions with said plate and provided with a depending flange extending along the rear edge and one side edge of said cover to engage over the plate flange leaving spaces at the front and one side of the vessel between the plate and cover for the discharge of cooked articles.

In testimony whereof I affix my signature in presence of two witnesses.

WLADYSLAW WROBEL.

Witnesses:
F. E. WILEY,
E. J. COONEY.